(12) United States Patent
Morris et al.

(10) Patent No.: US 12,285,970 B2
(45) Date of Patent: Apr. 29, 2025

(54) UNIVERSAL SPINNER WHEEL

(71) Applicant: EZ Spare Wheel LLC, Roswell, GA (US)

(72) Inventors: Thomas E. Morris, Roswell, GA (US); Virginia Nye, Roswell, GA (US); Marcel Smeding, DP Goutum (NL)

(73) Assignee: IW Technologies, LLC, Atlanta, GA (US)

( * ) Notice: Subject to any disclaimer, the term of this patent is extended or adjusted under 35 U.S.C. 154(b) by 0 days.

(21) Appl. No.: 18/025,800

(22) PCT Filed: Oct. 26, 2022

(86) PCT No.: PCT/US2022/247859
§ 371 (c)(1),
(2) Date: Mar. 10, 2023

(87) PCT Pub. No.: WO2023/076364
PCT Pub. Date: May 4, 2023

(65) Prior Publication Data
US 2024/0286433 A1    Aug. 29, 2024

Related U.S. Application Data

(60) Provisional application No. 63/272,451, filed on Oct. 27, 2021.

(51) Int. Cl.
*B60B 11/10* (2006.01)
*B60B 27/06* (2006.01)

(52) U.S. Cl.
CPC .............. *B60B 11/10* (2013.01); *B60B 27/06* (2013.01); *B60B 2900/541* (2013.01)

(58) Field of Classification Search
CPC ......... B60B 11/10; B60B 27/06; B60B 15/26; B60B 15/263; B60B 3/14; B60B 3/147; B60B 3/16
See application file for complete search history.

(56) References Cited

U.S. PATENT DOCUMENTS

| | | | | |
|---|---|---|---|---|
| 5,601,343 | A * | 2/1997 | Hoffken ................... | B60B 1/06 301/111.04 |
| 10,086,644 | B2 * | 10/2018 | Wohlfarth ............... | B60B 19/00 |
| 10,759,218 | B2 * | 9/2020 | Wohlfarth ............... | B60B 3/147 |
| 11,001,098 | B2 * | 5/2021 | Dietrich ............... | B60K 7/0007 |
| 11,607,909 | B2 * | 3/2023 | Rovito ................... | B60B 3/147 |
| 2021/0394552 | A1 * | 12/2021 | Rudd ..................... | B60B 15/266 |
| 2022/0379662 | A1 * | 12/2022 | Gualtieri ................ | B60C 7/146 |

* cited by examiner

Primary Examiner — Jason R Bellinger
(74) Attorney, Agent, or Firm — Walter A. Rodgers

(57) ABSTRACT

A vehicle wheel for the purpose of slow speed temporary movement of the vehicle whereby the inner portion of the wheel disc includes a curved surface disposed in rotating contact with the beveled surface of the cylinder element of the attachment hub. The wheel disc and the attached tire extend outwardly from the attachment hub. The attachment hub includes the cylinder with a securing ring affixed to the inwardly extending portion of the cylinder and disposed in abutting relation with the inner surface of the wheel disc wherein the outer surface of the cylinder is disposed between the securing ring and a flange.

15 Claims, 4 Drawing Sheets

UNIVERSAL SPINNER WHEEL

The benefits under 35 USC 119(e) are claimed of provisional application 63/272,451 filed Oct. 27, 2021.

BACKGROUND OF THE INVENTION

In vehicle repair facilities, it is traditional to mount cars under repair on conventional jack stands. Often, multiple cars are mounted on jack stands causing a crowded condition in the repair shop and the vehicles cannot be moved without a great deal of difficulty. Therefore, there is a need to enable a vehicle under repair to be conveniently moved around the repair shop or other location, as desired.

Cars that are towed to repair shops are routinely stuck in gear or have completely lost the ability to move under power. Also, towing companies retrieve cars from the consumer and often drop them in front of the service center creating the issue of how to move them into the shop to an area that won't interfere with the shop's traffic pattern and so that they can begin to repair the car.

To move cars on which wheels are locked is a significant problem and known solutions range from moving the cars with a forklift, if they have one available, or using expensive rolling platforms that clamp onto the tires and function similar to a wheel. These platforms operate independently of the vehicle's braking system and don't perform well on uneven surfaces or surfaces with cracks and crevices. If a tow truck is necessary, the disabled car must be dragged onto the platform which can cause damage to the car.

The universal wheel is engineered to bolt onto most 4, 5, 6 and 8 lug vehicles. The steel center hub is constructed with a universal bolt pattern typically comprising two versions, a 4/5 lug pattern and a 5/6 lug pattern. The 10 mm steel center is made with high grade steel and is powder coated to protect it from the elements. The bolt holes have a 60-degree cone seat design that makes it possible to work with most of the OEM nuts and bolts. The 22- and 26.5-inch wheel is made from high performance injection molded plastic and the tire is made from a thermoplastic polymer.

BRIEF SUMMARY OF THE INVENTION

By this invention, a free spinning vehicle wheel is provided whereby a wheel disc and attached tire extend outwardly from an attachment hub and the wheel disc includes a sliding inner surface. The attachment hub includes a cylinder with a securing ring affixed to the inwardly extending portion of the cylinder and disposed in abutting relation with the inner surface of the wheel disc. A beveled surface extends around the outer surface of the cylinder. The sliding surface of the wheel disc is disposed around the beveled surface of the cylinder to allow the wheel to freely rotate.

DETAILED DESCRIPTION OF THE INVENTION

Figure 1:
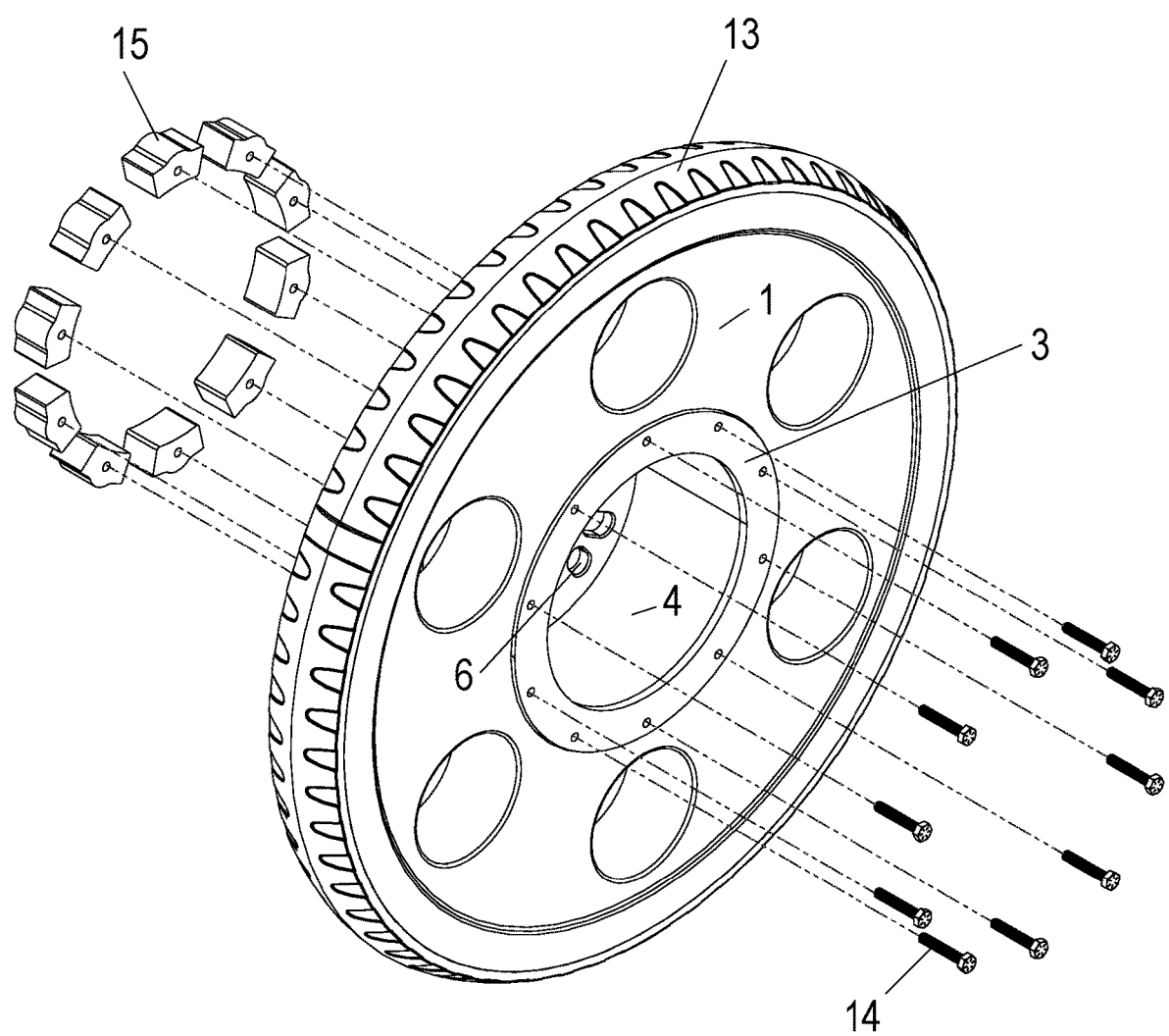
FIG. 1 is an exploded perspective view of the outer side of the vehicle wheel showing attachment feature.

The universal wheel, according to this invention, is generally mounted on automobiles which have a variety of lug patterns. As shown in the drawings, wheel disc 1 extends outwardly from attachment hub 2 which is unitary and disposed at the center of the wheel. Hub 2 includes outer circular flange 3 integrally joined to the outer edge of cylinder 4 and, on the inner edge of cylinder 4, aperture plate 5 is integrally affixed and extends inwardly therefrom. Multiple lug receiving apertures 6 are formed in aperture plate 5 and are configured to receive a variety of vehicle wheel lugs in varying patterns, for example, 4, 5, 6 and 8 universal lug bolt patterns. A central bore is formed in aperture plate 5 to receive the automobile axle, as is well known.

Figure 3:
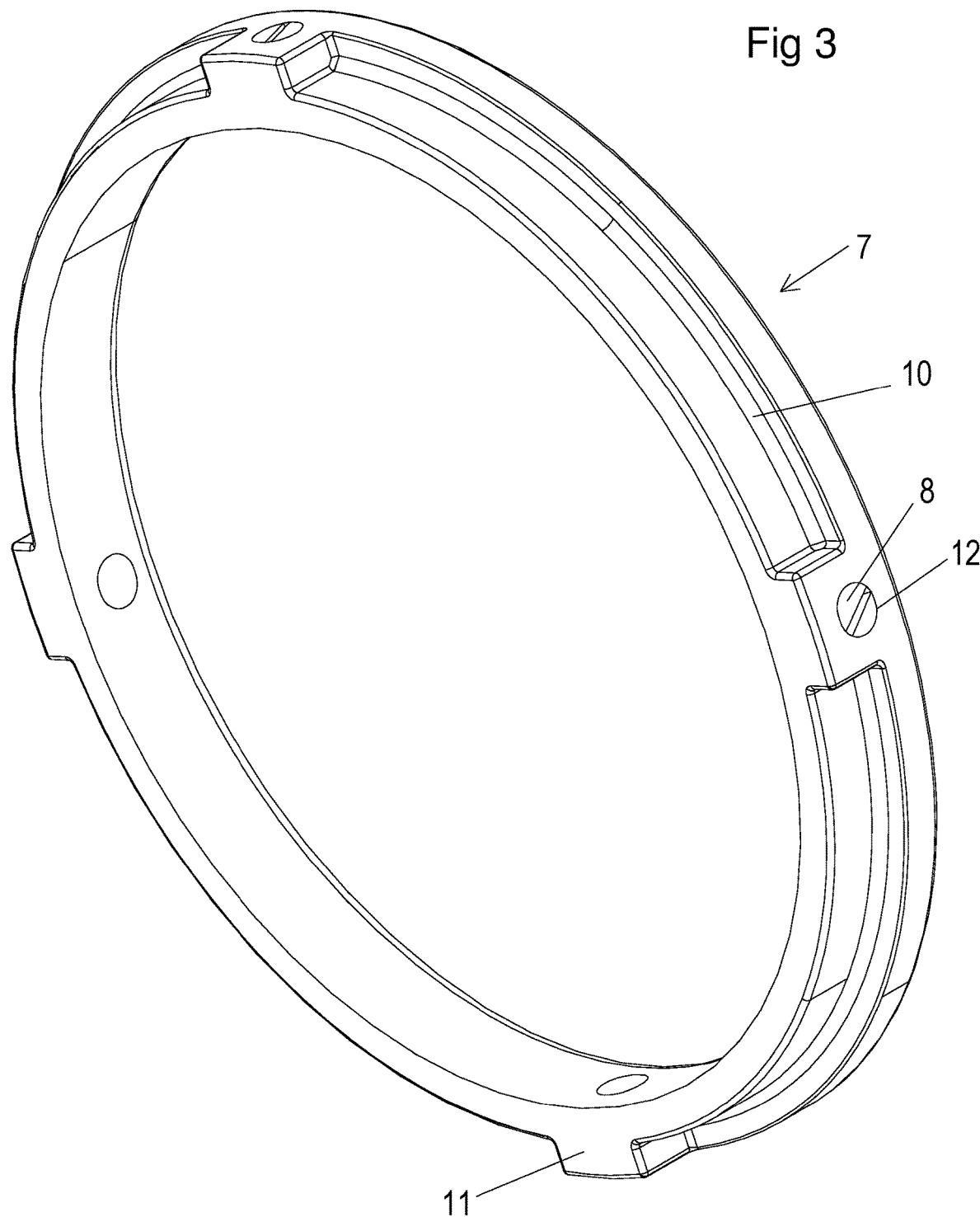
FIG. 3 is an enlarged perspective view of the securing ring.

According to a feature of this invention, a securing ring, generally indicated by the numeral 7 in FIG. 3, is spaced inwardly from flange 3 and extends around the outer periphery of cylinder 4 of hub 2. Ring 7 is secured to hub 2 by means fasteners in the form of four screws or bolts 8 which extend into corresponding threaded apertures formed in cylinder 4. Screws or bolts 8 are flexible to provide stress dampening to counter normal vibration encountered in the movement of the automobile and especially the components of the vehicle wheel.

Figure 4:
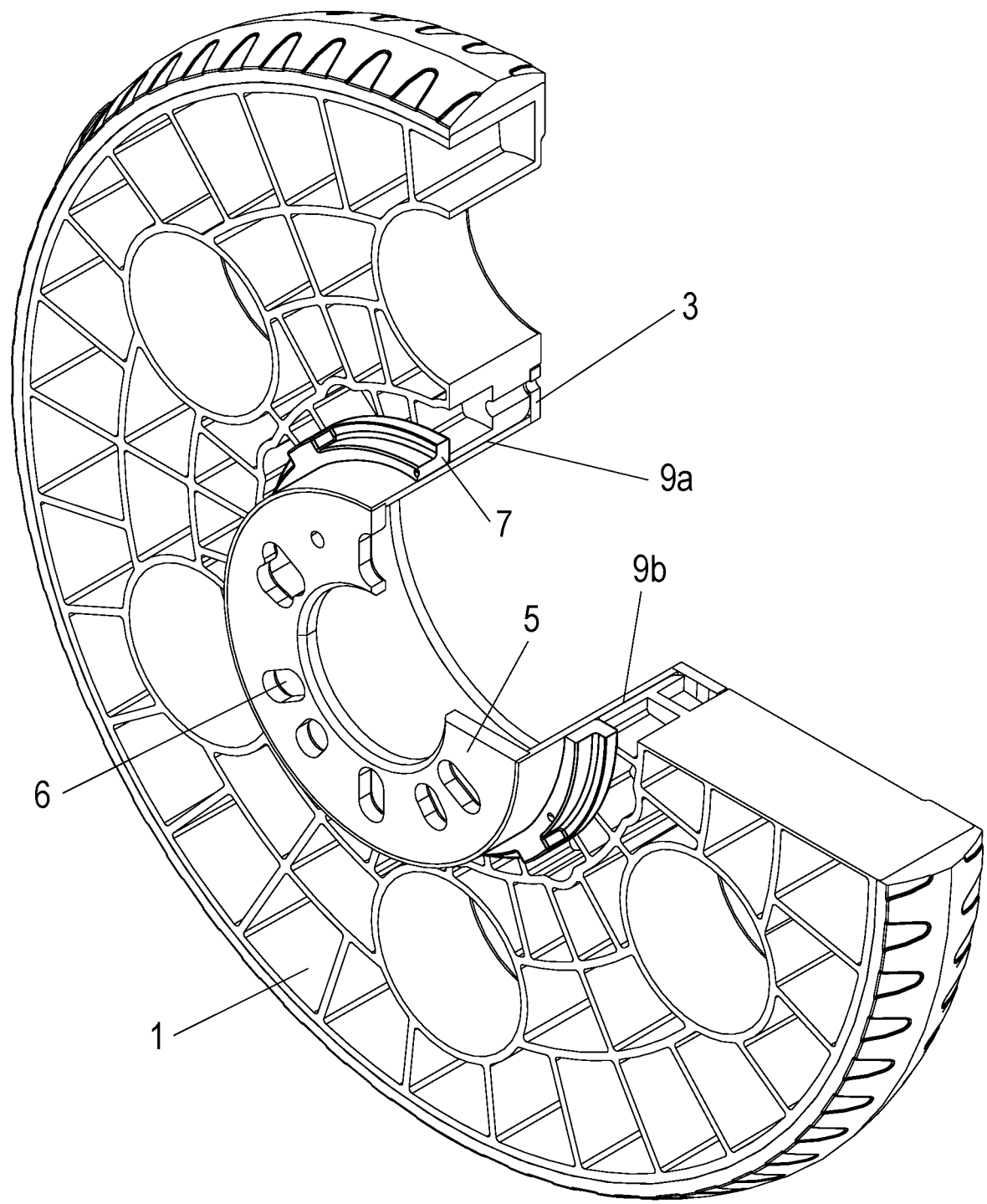
FIG. 4 is a partial perspective view of the inner components of the vehicle wheel taken along the line 4-4 in FIG. 2.

According to this invention and as best shown in FIG. 4, hub 2 comprises bearing surface 9a which extends around the outer periphery of cylinder 4 between flange 3 and securing ring 7. Also, the inner surface of wheel disc 1 is curved at 9b and is disposed around bearing surface 9a in an abutting manner to allow surface 9b to rotate around surface 9a.

With particular reference to FIG. 3, the details of securing ring 7 are shown wherein ring 7 is of a circular configuration and includes circular channel 10, the curvature of which provides added rigidity and strength to ring 7 and ensures that hub 2 is correctly centered on the vehicle. Wedges 11 are integrally joined to securing ring 7 the underside of which conform to the contours of the surface of securing ring 7 and channel 10 and provide strength at the attachment point between securing ring 7 and hub 2. Apertures 12 extend through each wedge 11 and flexible bolts 8 extend through apertures 12 and into corresponding threaded apertures formed in cylinder 4 of hub 2.

Wheel disc 1 is provided with tire 13 extending around the periphery thereof, as is well known.

Figure 2:
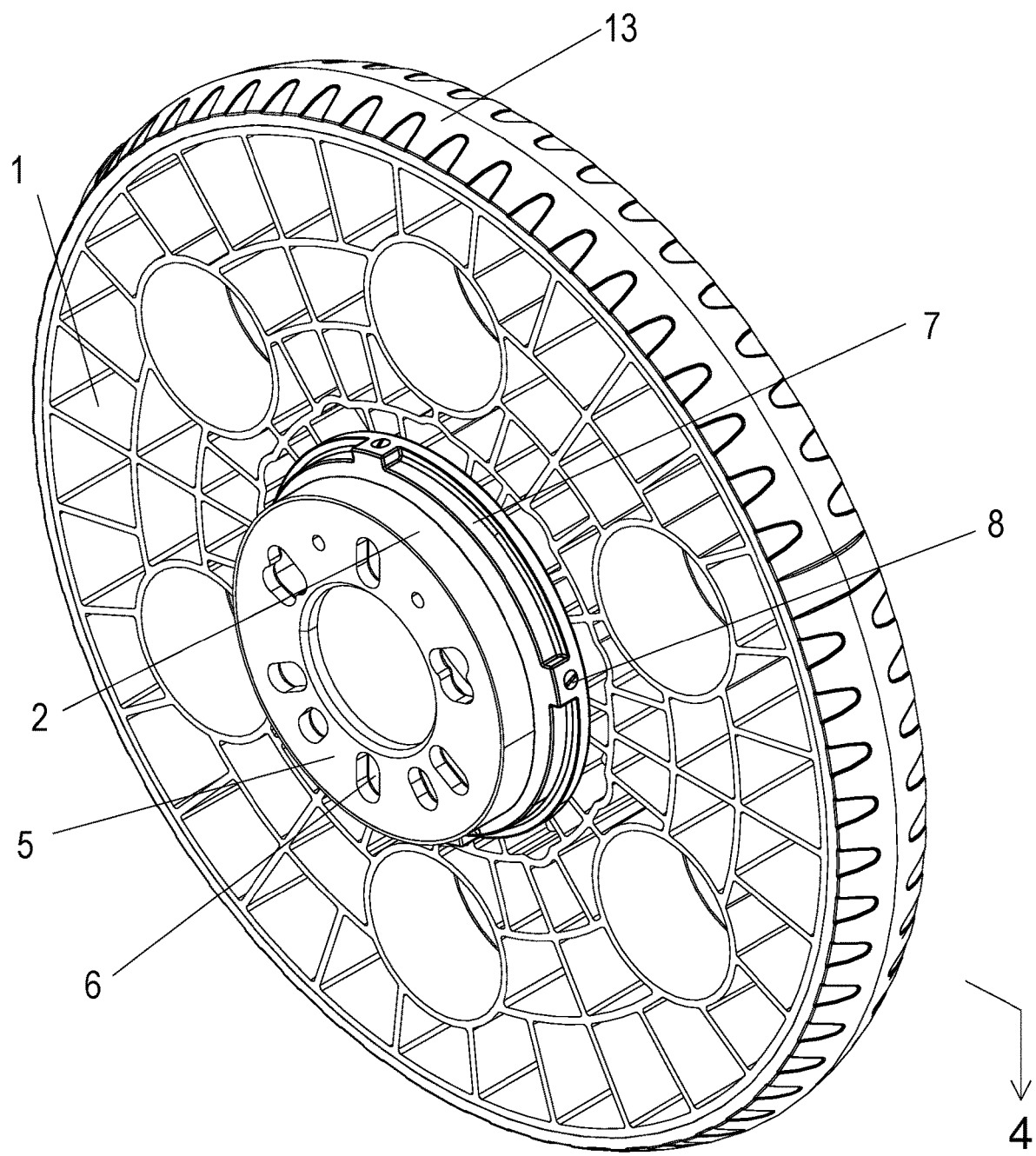
FIG. 2 is a perspective view of the inner side of the vehicle wheel showing the securing ring according to this invention.

As shown in FIG. 1, a nonspinning universal wheel is assembled by securing wheel disc 1, tire 13 and attachment hub 4 by means of multiple bolts 14 which are screwed into wedge nuts 15 which are disposed in corresponding cavities formed on the inner side of wheel disc 1. The cavities are best shown in FIG. 2. Wedge nuts 15 are configured of a dimension one millimeter larger than the inside dimension of the respective wheel disc cavity. By this means, wedge nuts 15 are forced into each cavity and are frictionally maintained within the cavities to prevent them from inadvertently falling out when not interconnected to the bolts.

The nonspinning universal wheel is mounted on an automobile whereby the wheel lugs extend through apertures 6 and the wheel is secured in place thereto by conventional lug nuts. By this means, the universal wheel is securely affixed to the automobile in a conventional manner and in situations where a nonspinning tire is applicable.

In order to convert a nonspinning universal wheel to a spinner-roller wheel. As shown in FIG. 1, bolts 14, from the front side of the vehicle wheel, are loosened from corresponding wedge nuts 15 and removed. Ring 7 is then slipped over the inner free end of cylinder 4 to a position flush with the inner surface of wheel disc 1 and attached thereto by means of bolts 8 which extend through apertures 12 disposed in wedges 11 and are affixed to corresponding threaded apertures disposed in cylinder 4. By this means, wheel disc 1 and attached tire 13 are freely rotatable around hub 2. The bearing surface 9a and sliding surface 9b are appropriately lubricated to enhance rotation of the wheel. To return the wheel to a normal rolling wheel, it is simply necessary to reinstall bolts 14 and interconnect them with corresponding wedge nuts 15 which are secured in cavities on the inner side of the wheel. Once installed, ring 7 stays in place whether the wheel is configured to spin or not.

Therefore, by this invention, a universal wheel provides a unique mobility solution for standard or electric cars in situations where the brakes freeze or there is no power to the vehicle wheels. The is hub bolted onto the automobile in the conventional manner and then the car can be pushed or pulled around the repair shop or maneuvered onto a tow truck. The universal spinner wheel is easily converted into a conventional wheel whereby the bolts securing the flange to the steel center of the wheel are reinstalled.

The invention claimed is:

1. A vehicle wheel comprising
a central attachment hub,
a wheel disc extending outwardly from said attachment hub and comprising an inner portion,
said attachment hub comprising a cylinder,
said cylinder compriisng an inwardly extending portion,
said cylinder comprising an inner and an outer edge and the inner edge positioned inwardly of said wheel disc, and
a securing ring extending around the outer surface of said inwardly extending portion of said cylinder.

2. The vehicle wheel according to claim 1 wherein said wheel disc comprises an inner side, a flange is affixed to said outer edge of said cylinder, multiple apertures are formed in said flange, bolts extend through said apertures and are interconnected to wedge nuts disposed on said inner side of said wheel disc.

3. The vehicle wheel according to claim 1 wherein said attachment hub comprises an aperture plate attached to the inner edge of said cylinder and multiple apertures are formed in said aperture plate.

4. The vehicle wheel according to claim 3 wherein said multiple apertures form a universal lug receiving pattern.

5. The vehicle wheel according to claim 1 wherein said securing ring comprises a curved channel extending around the outer surface of said securing ring.

6. The vehicle wheel according to claim 1 wherein multiple wedges are secured to the outer surface of said securing ring and said apertures extend respectively through said wedges.

7. The vehicle wheel according to claim 6 wherein fasteners extend through said apertures and into threaded apertures formed in said cylinder.

8. The vehicle wheel according to claim 1 wherein said inner portion of said wheel disc comprises a curved sliding surface.

9. The vehicle wheel according to claim 8 wherein a flange is secured to said outer edge of said cylinder, the outer surface of said cylinder disposed between said securing ring and said flange comprises a bearing surface and said sliding surface of said wheel disc is adapted to slide on said bearing surface to cause said vehicle wheel to rotate in a free-spinning fashion.

10. The vehicle wheel according to claim 1 wherein a flange is affixed to said outer edge of said cylinder and said flange is interconnected to said wheel disc by fasteners.

11. The vehicle wheel according to claim 10 wherein said wheel disc comprises an inner side and said fasteners comprise wedge nuts disposed in cavities formed on said inner side.

12. The vehicle wheel according to claim 11 wherein the outer dimension of said wedge nuts is larger than the inner dimension of said cavities.

13. A method of assembling a vehicle wheel wherein the wheel comprises
an attachment hub,
a wheel disc extending outwardly from said hub,
said hub comprising a circular cylinder,
said cylinder having an outer and an inner end,
a flange affixed to said outer end,
said flange secured to said wheel disc,
said cylinder extending inwardly from said flange,
the method comprising the steps of
disengaging said flange from said wheel disc,
positioning a securing ring on said inwardly extending cylinder in abutting relation with said wheel disc, and
interconnecting said securing ring to said cylinder by means of fasteners.

14. The method according to claim 13 wherein wedges are affixed to said securing ring, apertures are formed in said wedges, and said fasteners are extended through said apertures formed in said wedges and into threaded apertures formed in said cylinder.

15. The method of converting a vehicle wheel to a free-spinning wheel wherein the wheel comprises
an attachment hub,
a wheel disc extending outwardly from said hub,
said hub comprising a circular cylinder,
said cylinder having an outer and an inner end,
a flange affixed to said outer end,
said flange secure to said wheel disc,
said cylinder extending inwardly from said flange,
a securing ring interconnected to said cylinder by fasteners,
said securing ring disposed adjacent said wheel disc,
the method comprising the step of
disengaging said flange from said wheel disc.

* * * * *